United States Patent [19]
Fujiwara et al.

[11] 4,027,063
[45] May 31, 1977

[54] FLAME RETARDANT THERMOSETTING RESIN

[75] Inventors: Yoshio Fujiwara; Keiichi Naito; Yoshinobu Fujimoto, all of Utsunomiya; Tooru Odashima, Kanuma; Tomohiko Sada, Tokyo, all of Japan

[73] Assignee: Sony Corporation, Tokyo, Japan

[22] Filed: May 13, 1975

[21] Appl. No.: 577,087

Related U.S. Application Data

[60] Continuation-in-part of Ser. No. 547,776, Feb. 7, 1975, abandoned, which is a division of Ser. No. 389,213, Aug. 17, 1973, abandoned.

[30] Foreign Application Priority Data

Sept. 14, 1972 Japan .............................. 47-91746

[52] U.S. Cl. .................................. 428/273; 96/36.2; 96/115 R; 96/115 P; 204/159.17; 204/159.22; 204/159.23; 260/836; 428/901; 428/920; 526/204; 526/227; 526/230; 526/232; 526/272

[51] Int. Cl.² ................ B32B 17/02; C08F 222/04; C08L 63/00; G03C 5/00

[58] Field of Search ................. 260/78.40, 78.5 BB; 96/115 R, 115 P, 362; 428/273, 901; 204/159.22, 159.23, 159.17; 526/272

[56] References Cited

UNITED STATES PATENTS

| 3,322,853 | 5/1967 | Trementozzi | 260/879 |
|---|---|---|---|
| 3,546,184 | 12/1970 | Heidel et al. | 260/78.4 D |
| 3,558,423 | 1/1971 | Rossetti, Jr. | 428/901 |
| 3,652,520 | 3/1972 | Ryan et al. | 260/880 |
| 3,700,538 | 9/1970 | Kennedy | 428/901 |
| 3,707,399 | 4/1971 | Uffner | 428/273 |
| 3,741,858 | 6/1973 | Fujiwara et al. | 428/901 |
| 3,759,808 | 9/1973 | Parker et al. | 204/159.23 |
| 3,766,215 | 10/1973 | Hesse et al. | 260/78.5 BB |
| 3,840,390 | 10/1974 | Kozu et al. | 204/159.16 |

FOREIGN PATENTS OR APPLICATIONS

| 46-10672 | 3/1971 | Japan |
|---|---|---|
| 46-14538 | 4/1971 | Japan |

*Primary Examiner*—Joseph L. Schofer
*Assistant Examiner*—Herbert J. Lilling
*Attorney, Agent, or Firm*—Lewis H. Eslinger; Alvin Sinderbrand

[57] ABSTRACT

A flame retardant thermosetting resin composition having improved properties as an electrical insulating material and being particularly suited for use in printed circuit boards composed essentially of acryloyloxy- or methacryloyloxy-terminated butadiene homopolymer or butadiene copolymer with, for example, acrylonitrile or styrene, ethylenically unsaturated monomer capable of copolymerizing with the terminating acryloyloxy- or methacryloyloxy- groups of the butadiene homopolymer or copolymer, which monomer has a substantial amount of haloaryl, and acid anhydride having at least one ethylenically unsaturated group. In preferred compositions of the invention, there are from 1.5 to 3.0 terminating acryloyloxy- or methacryloyloxy- groups per molecule of the butadiene homopolymer of copolymer, the amounts of ethylenically unsaturated monomer and of acid anhydride are from 150 to 500 weight percent and from 5 to 20 weight percent, respectively, based on the weight of terminated butadiene homopolymer or copolymer, and the amount by weight of halogen is 25 to 70 percent of the weight of the composition. A particularly desirable composition is obtained when the acryloyloxy- or methacryloyloxy-terminated polymer or copolymer is at least 70 weight percent 1,2-polybutadiene; chlorine and bromine are the halogens, bromine being preferred.

15 Claims, 1 Drawing Figure

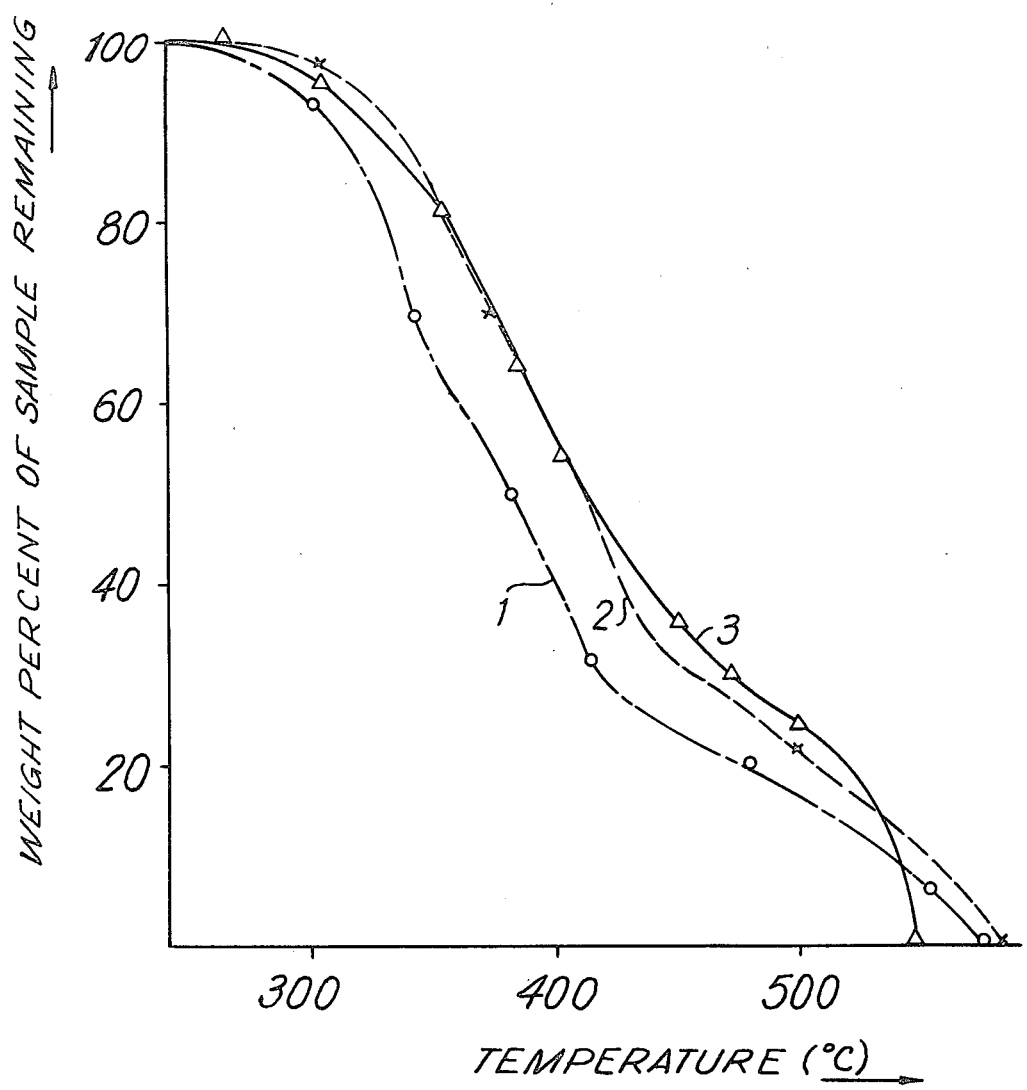

FLAME RETARDANT THERMOSETTING RESIN

CROSS REFERENCE TO RELATED APPLICATION

This application is a continuation-in-part of copending U.S. patent application Ser. No. 547,776 filed Feb. 7, 1975, now abandoned, which is a division of U.S. patent application Ser. No. 389,213, filed Aug. 17, 1973, now abandoned.

FIELD OF THE INVENTION

This invention relates to flame retardant thermosetting resin compositions for use as electrical insulating materials and the like.

DESCRIPTION OF THE PRIOR ART

Among the resins heretofore employed as electrical insulating materials are silicones, polytetrafluoroethylenes, polyimides, epoxy resins, polyesters, phenolic resins, diallyl phthalate resins and so on. The silicones, polytetrafluoroethylenes, polyimides and the like are expensive and hence only used for special purposes. The epoxy resins, phenolic resins, polyesters, diallyl phthalate resins and so on are widely used, but they do not have excellent electrical characteristics or adequate flexibility and are not flame retardant to suitable extent. From the viewpoint of electrical characteristics, thermoplastic resins such as polyethylene are excellent, but they have poor heat resistance as well as flame retardation properties, and hence are limited in use.

Addition to the foregoing resins of agents or ingredients to enhance flame retardation characteristics heretofore has caused deterioration of electrical characteristics and reduced chemical resistance. Such additions especially affect adversely the dielectric constant and the dielectric loss ($\tan\delta$) according to frequency.

A resin composition for use as electrical insulation, especially a resin composition for impregnation of glass cloth, as in a printed circuit board, or moulding, should have excellent electrical and flame retardation characteristics and also be of a low-viscosity, nonsolvent type. Further, flame retardant resin compositions for printed circuit boards and flexible printed wiring, in addition to having excellent electric characteristics and good impregnating properties, must have good chemical resistance to withstand the process used in fabrication of a printed circuit board and also good mechanical characteristics after being hardened.

Recently, various studies have been conducted on the use for the above purposes of polymers composed mainly of butadiene because of the favorable electrical characteristics of such polymers. The previously available polymers composed principally of butadiene are liquid and of low molecular weight within a very narrow range, and, further, their end groups are terminated with reactive functional groups such as hydroxyl groups, carboxyl groups and the like. However, satisfactory resin compositions of such polymers for printed wiring or circuit boards have not been obtained up to now. For example, in Japanese Patent Application Publications Nos. 14538/71 and 10672/71, an hydroxy-terminated butadiene polymer is modified with an $\alpha,\beta$-unsaturated acid, or mixed with that acid, and then hardened by copolymerizing with a vinyl monomer in the presence of a suitable peroxide as a hardening agent. The hardening speed, however, is low in the case where the hydroxy-terminated butadiene polymer is modified with the $\alpha,\beta$-unsaturated acid, and the copolymerizing is only poorly achieved in the case where the hydroxy-terminated butadiene polymer is only mixed with the acid.

OBJECTS AND SUMMARY OF THE INVENTION

Accordingly, it is an object of this invention to provide improved thermosetting resin compositions suited for use as electrical insulating materials that are flame retardant and have excellent electrical and mechanical characteristics as well as superior chemical resistance.

Another object is to provide flame retardant thermosetting resin compositions, as aforesaid, which are particularly suited for use in printed circuit boards, and with which adequate hardening of the resin composition is achieved even at the surfaces of the printed circuit board contacted by electrolyzed copper foils.

The flame retardant thermosetting resin compositions according to this invention are based on the discovery by the present inventors that the copolymerizing of a liquid butadiene homopolymer or copolymer with ethylenically unsaturated or vinyl monomer during either peroxide hardening or light hardening with a photosensitizer is improved when the polymer or copolymer is terminated with either acryloyloxy groups or methacryloyloxy groups, respectively:

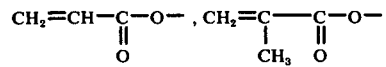

that gelation at an early stage of the above-mentioned copolymerization of the terminated-butadiene homopolymer or copolymer with the monomer is promoted by the addition thereto of an acid anhydride containing at least one ethylenically unsaturated group in its molecule, and that flame retardation is imparted or greatly enhanced by use of monomer having a significant amount of halogen-substituted aryl.

The foregoing is of particular importance in respect to the manufacture of printed circuit boards having electrolyzed copper foil applied against one or more of the surfaces of a sandwich of resin impregnated glass cloth, and in which the peroxide or light hardening of the resin at the confronting surface of the foil is deleteriously affected by the presence of the latter. It has been found that such problem is not susceptible to any chemical solution, other than by the promotion of the gelation at an early stage of the copolymerization, as described above. It has also been found that the hardening and electrical properties of the thermosetting resin compositions according to this invention are further improved when a major proportion, for example, 70 weight percent or more, of the liquid butadiene polymer or copolymer is constituted by 1,2-polybutadiene.

BRIEF DESCRIPTION OF THE DRAWING

The accompanying drawing is a graph with curves based on thermogravimetric data measured by thermobalance showing heating loss obtained by hardening resin compositions disclosed hereinafter.

DETAILED DESCRIPTION AND PREFERRED EMBODIMENTS

Accordingly, a thermosetting flame retardant resin composition of this invention is composed essentially of butadiene-containing resin that is an acryloyloxy- or methacryloyloxy-terminated butadiene homopolymer or butadiene copolymer, ethylenically unsaturated or vinyl monomer copolymerizable with the terminating groups of the butadiene-containing resin, which monomer has a substantial amount of haloaryl, and ethylenically unsaturated acid anhydride.

Various methods exist for obtaining the butadiene homopolymer or copolymer terminated with acryloyloxy- or methacryloyloxy- groups. For example, a reactive acrylate or methacrylate having a hydroxyl group, such as 2-hydroxyethyl acrylate, 2-hydroxyethyl methacrylate or the like, is first reacted with a compound having two different reactive isocyanate groups, such as 2,4-tolylene-diisocyanate, and the resulting reaction product is then reacted with the end hydroxyl groups of an hydroxy-terminated butadiene homopolymer or copolymer. It is also possible to cause an acid chloride, such as an acrylic chloride or methacrylic chloride, to react directly with an hydroxy-terminated butadiene homopolymer or copolymer for terminating the latter with the desired acryloyloxy- or methacryloyloxy- groups. Further, the terminating acryloyloxy- or methacryloyloxy- groups can be directly introduced on a carboxy-terminated butadiene homopolymer or copolymer by esterification of the latter with a reactive acrylate or methacrylate having an epoxy group, such as glycidyl methacrylate, in the presence of an acid, amine or other suitable catalyst.

Among commercially available hydroxy-terminated butadiene homopolymers that can be used as starting materials in the above-described methods for producing the acryloyloxy- or methacryloyloxy-terminated compounds are:

NISSO-PB-G-2000 (1,4-trans 10% 1,2-vinyl 90%, about 2.0 hydroxy-terminals per molecule, viscosity about $1.8 \times 10^6$ cps by Brookfield Viscometer at 25° C, from Nihon Soda Co., Ltd.);

R - 15M (1,4-trans 60% 1,4-cis 20%, 1,2-vinyl 20%, average molecular weight about 3300, about 2.3 hydroxy-terminals per molecule, viscosity about $2.2 \times 10^4$ cps by Brookfield Viscometer at 30° C, from ARCO Chem. Co., Ltd.); and R - 45M (1,4-trans 60% 1,4-cis 20%, 1,2-vinyl 20%, average molecular weight about 2600, about 2.3 hydroxy-terminals per molecule, viscosity about $5.0 \times 10^3$ cps viscosity by Brookfield Viscometer at 30° C, from ARCO Chem. Co., Ltd.).

Among commercially available hydroxy-terminated butadiene copolymers that can be used as starting materials are:

CS - 15 (1,4-trans 60% 1,4-cis 20%, 1,2-vinyl 20%, average molecular weight about 2600, about 2.7 hydroxy-terminals per molecule, viscosity about $2.3 \times 10^4$ cps by Brookfield Viscometer at 30° C, from ARCO Chem. Co., and which is a copolymer of butadiene and acrylonitrile in the ratio, by weight of 75:25); and CN - 15 (1,4-trans 60%, 1,4-cis 20%, 1,2-vinyl 20%, 2.7 hydroxy-terminals per molecule, viscosity about $5.0 \times 10^4$ cps by Brookfield Viscometer at 30° C, from ARCO Chem. Co., Ltd., and which is a copolymer of butadiene and styrene in the ratio, by weight, of 85:15).

Among commercially available carboxy-terminated butadiene homopolymers that can be used as starting materials for producing the acryloyloxy- or methacryloyloxy-terminated butadiene homopolymers are:

NISSO-PB-C-2000 (1,4-trans 10%, 1,2-vinyl 90%, average molecular weight about 2000, about 2.0 carboxy-terminals per molecule, viscosity about $4.0 \times 10^6$ cps by Brookfield Viscometer at 25° C, from Nihon Soda Co., Ltd.); and Hycar CTB (1,4-trans 53% 1,4-cis 22%, 1,2-vinyl 25%, average molecular weight about 4370, about 2.0 carboxy-terminals per molecule, viscosity about $2.5 \times 10^4$ cps by Brookfield Viscometer at 27° C, from B.F. Goodrich Co., Ltd.).

Among commercially available carboxy-terminated butadiene copolymers that can be used as starting materials is:

Hycar CTBN (1,4-trans 64%, 1,4-cis 24%, 1,2-vinyl 12%, average molecular weight about 3270, about 1.7 carboxy-terminals per molecule, viscosity about $1.2 \times 10^5$ cps by Brookfield Viscometer at 27° C, from B.F. Goodrich Co., Ltd., and which is a copolymer of butadiene and acrylonitrile in the ratio, by weight, of 81:19).

A methacryloyloxy-terminated butadiene homopolymer that is suitable for inclusion in flame retardant thermosetting resin compositions according to this invention is available commercially under the tradename NISSO-PB-TE-2000 from Nihon Soda Co., Ltd., and has a viscosity of about $3.6 \times 10^5$ cps by Brookfield Viscometer at 40° C. The product is produced by reacting the hydroxy-terminated butadiene homopolymer Nisso-PB-G-2000, referred to above, with the reaction product of 2-hydroxyethyl methacrylate and 2,4-tolylene-diisocyanate.

It is preferable that the butadiene homopolymer or copolymer terminated with acryloyloxy- or methacryloyloxy- groups have an average molecular weight in the range from about 1000 to about 5000 so as to provide a resin composition according to this invention having a viscosity that is suitable to use for impregnation or moulding. When a butadiene copolymer is employed, the proportion of butadiene in the copolymer should be at least 70 weight percent. Further, copolymers of butadiene with styrene or acrylonitrile are preferred in order to provide the thermosetting resin compositions according to this invention having desirable electrical characteristics, particularly in respect to the dielectric constant and surface resistance thereof.

In order to provide the desirable fast initiation of gelatinization in the hardening process, the butadiene homopolymer or copolymer included in the flame retardant thermosetting resin compositions according to this invention should be terminated with from about 1.5 to about 3.0 acryloyloxy- or methacryloyloxy- groups per molecule of the polymer. Further, the most desirable electrical characteristics, such as dielectric constant and surface resistance, and the most desirable mechanical properties are obtained with the final thermoset compositions according to the invention when the acryloyloxy- or methacryloyloxy-terminated butadiene-containing resin is butadiene homopolymer, and particularly butadiene homopolymer containing at least 70 weight percent of 1,2-polybutadiene.

Ethylenically unsaturated monomers for making the compositions of this invention have to be capable of copolymerization with the end vinyl group of the acryloyloxy- or methacryloyloxy-terminal groups of the butadiene polymer, have to serve as good solvents for such polymer, and have to provide flame retardant character to the final thermoset resins. For that latter purpose, the monomers must contain halogen elements directly attached to benezene rings, and the total weight of halogen must be more than about 25 weight percent of the total weight of the compositions. Mixtures of both halogenated and nonhalogenated ethylenically unsaturated monomers can be used provided the total amount of halogen in the compositions exceeds about 25 weight percent of both kinds together. A practical upper limit on the amount of halogen appears to be about 70 weight percent, at which level the butadiene content of the ultimate resin composition is not relatively reduced enough to cause deterioration of the desired electrical characteristics of the composition. More advantageously, the amount of halogen should be about 25 to 50 weight percent, and preferably about 28 to about 40 weight percent. Chlorine and bromine are the preferred halogens, with bromine being the more advantageous.

Among suitable ethylenically unsaturated monomers are vinyl monomers such as styrene, divinyl-benzene, methyl methacrylate, methyl acrylate, glycidyl methacrylate, ethylene dimethacrylate, monobromostyrene, dibromostyrene, tribromophenyl acrylate, tribromophenyl methacrylate, 2,2-bis(4'-allyloxy-3',5'-dibromophenyl)-propane, monobromophenyl allyl ether, tribromophenyl allyl ether, monochlorostyrene, dichlorostyrene and the like.

The amount of such vinyl monomer in the resin composition according to this invention should be between about 150 and 500 weight percent based on the amount of the acryloyloxy- or methacryloyloxy-terminated butadiene homopolymer or copolymer in the composition. If the amount of the vinyl monomer is less than about 150 weight percent, the viscosity of the resin composition according to this invention is initially too high for its use in impregnating glass or polyester cloth or in moulding. If the amount of vinyl monomer is substantially greater than about 500 weight percent, then the electrical characteristics and flexibility of the thermoset compositions are deleteriously affected. For example, in the case of a flame retardant thermosetting resin composition employing Nisso-PB-TE-2000 as the methacryloyloxy-terminated butadiene homopolymer, 50 weight percent solution of styrene in the resin has a viscosity of about 1500 CPS, 100 weight percent of styrene has a viscosity of about 130 CPS, and 200 weight percent of styrene has a viscosity of about 20 CPS, all measured by a Brookfield Viscometer at 20° C.

Acid anhydrides having at least one ethylenically unsaturated group in their molecule, and which are suitable for use in the flame retardant thermosetting resin compositions according to this invention, should be soluble in the above-mentioned butadiene-containing resins and monomers, should contribute to the copolymerization thereof, and should serve to promote gelation of the resin. Among suitable acid anhydrides are maleic acid anhydride, itaconic acid anhydride, methyl-endo-methylene tetrahydrophthalic acid anhydride (for example, available commercially under the tradename Anhydride methyl-CD acid from Nihon Kayaku Co., Ltd. and having the structural formula shown below), methyl tetrahydrophthalic acid anhydride (for example, available commercially under the tradename HN-2000 from Hitachi Kasei Co., Ltd., and having the structural formula shown below), tetrahydrophthalic acid anhydride, dodecenyl succinic acid anhydride (having the structural formula shown below), and the like acid anhydrides.

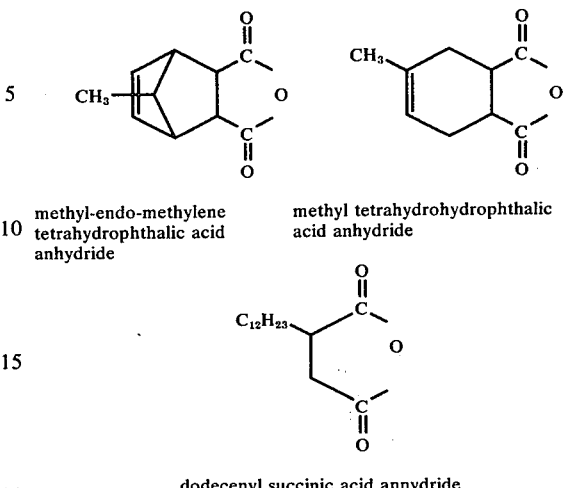

methyl-endo-methylene tetrahydrophthalic acid anhydride methyl tetrahydrohydrophthalic acid anhydride dodecenyl succinic acid annydride The amount of such acid anhydrides in the thermosetting compositions according to this invention is preferably in the range between about 5 and about 20 weight percent based on the amount of the acryloyloxy- or methacryloyloxy-terminated butadiene homopolymer or copolymer in the composition. If the amount of acid anhydride is less than about 5 weight percent, its effect in promoting gelatinization is undesirably decreased, particularly in the initial copolymerization stages. If more than 20 weight percent of the acid anhydride is employed, the electrical characteristics and chemical resistance of the hardened resin composition are adversely effected.

The flame retardant compositions according to the invention can also include conventional peroxide hardening agents or photosensitizers for promoting light-hardening. Among peroxides suitable for hardening the thermosetting compositions of this invention are benzoyl peroxide, lauroyl peroxide, dicumyl peroxide, methyl ethyl ketone peroxide, cumene hydroperoxide, dibutyl peroxide and so on. Among photosensitizers suitable for light-hardening of the compositions according to this invention are benzoin, benzophenone, benzoin ethyl ether, 2-methyl-anthraquinone and other like materials known in the art. The amount of peroxide of photosensitizer is preferably in the range between about 0.1 and about 2 weight percent based on the total weight of the resin composition.

The invention will be further explained with reference to the following illustrative examples in which all parts, percentages and proportions are by weight, unless otherwise indicated.

EXAMPLE 1

100 Parts by weight (here and throughout) of Nisso-PB-TE-2000 (a methacryloyloxy-terminated butadiene polymer in which 1,2-vinyl is more than 80%), 152 parts of dibromostyrene, 40 parts of styrene, 12 parts of maleic acid anhydride and 1.5 parts of benzoyl peroxide were mixed and dissolved, producing a resin composition of this invention. A film about 0.1 mm thick of the resin thus obtained was hardened for 10 minutes at 100° C and for 15 hours at 120° C. The tensile strength of the film was 175Kg/cm² (1 × 10 mm; pulling speed 50 mm/min; measured by Tension MT-4) and the amount of trichloroethylene extracted was 1.8 weight percent. Flame retardation tested on the basis of the standard UL-Sub. 94 passed SE-O.

A copper-clad laminated board was produced by impregnating 10 sheets of glass cloth (Nittobo WE 116 BV) with the resin and by coating electrolyzed copper foils 1 oz. (Gould Co., Ltd., T/C treated copper foils) on both sides of the board. The electric characteristics of the board (ASTM-D-150) thus obtained are shown in the Table below.

EXAMPLE 2

A flame retardant resin composition of this invention was obtained by mixing and dissolving 100 parts of Nisso-PB-TE-2000, 160 parts of styrene, 248 parts of tribromophenyl acrylate, 12 parts of maleic acid anhydride and 1.5 parts of benzoylperoxide.

A film of the resin composition was obtained in the manner described in Example 1. The tensile strength of the film was 142Kg/cm$^2$ and the amount of trichloroethylene extracted was 3.4 weight percent. Flame retardation passed SE-O. Thermogravimetric data of the composition at the rate of 20° C/min. are shown as Curve 2 in the accompanying drawing.

EXAMPLE 3

100 Parts of carboxyl-terminated butadiene polymer Nisso-PB-C-2000 were dissolved in 25 parts of styrene to which were then added 20 parts of glycidyl methacrylate, 0.08 part of hydroquinone and 0.5 part of sulfanilic acid. The mixture was heated at 90° C. for 6 hours and uniformly agitated, and reacted to form a yellow product. Because infrared absorption of ethylene oxide in the vicinity of 1230, 930, 830cm$^{-1}$ had disappeared and broad absorption of hydroxyl group in the vicinity of 3440cm$^{-1}$ had increased, it was ascertained that the end carboxyl group of the butadiene polymer had reacted with the glycidyl group to form a methacrylate-terminated butadiene polymer.

A resin composition of this invention was obtained by mixing and dissolving 150 parts of the above product, 100 parts of chlorostyrene (by Mitsubishi Gas Kagaku Co., Ltd.), 200 parts of tribromophenyl acrylate (by Osaka Yuke Kagaku Co., Ltd.), 12 parts of methyl-endo-methylene tetrahydrophthalic acid anhydride (by Nihon Kagaku Co., Ltd.) and 1.5 parts of benzoylperoxide.

A film of the composition was made as described in Example 1. The tensile strength of the film was 7Kg/cm$^2$ and the amount of trichloroethylene extracted was 7.2 weight percent. Flame retardation passed SE-O. Thermogravimetric data of the composition at the rate of 20° C/min. are shown as Curve 3 in the accompanying drawing.

EXAMPLE 4

The reaction product of 2,4-tolylenediisocyanate T-100 by Nihon Polyurethane) and 2-hydroxyethyl methacrylate (3 hours at 40° C.) was added to a hydroxy-terminated butadiene-acrylonitrile copolymer CN-15 in equivalent amount with respect to the hydroxyl groups of the copolymer CN-15, and the mixture was reacted at 50° to 60° C. for 7 hours to produce a methacryloyloxy-terminated butadiene-acrylonitrile copolymer.

A resin composition of this invention was made by mixing and dissolving 120 parts of the above-described reaction product, 40 parts of styrene, 100 parts of chlorostyrene, 200 parts of tribromophenyl acrylate, 12 parts of maleic acid anhydride and 1.5 parts of benzoylperoxide. A thermoset film of this composition passed SE-O in the flame retardant test.

EXAMPLE 5

A resin composition of this invention was prepared by mixing and dissolving 100 parts of Nisso-PB-TE-2000, 80 parts of chlorostyrene, 40 parts of styrene, 200 parts of tribromophenyl acrylate, 12 parts of maleic acid anhydride and 1.0 part of benzoylperoxide. A film of this composition passed SE-O in the flame retardant test.

REFERENCE EXAMPLE

A resin composition was made by mixing and dissolving 100 parts of Nisso-PB-TE-2000, 100 parts of styrene, 24 parts of 2,2-bis[4'-($\beta$-bromoethoxy)-3',5'-dibromophenyl]-propane and 0.5 parts of benzoylperoxide. A film was made as described in Example 1. The tensile strength of the film was 40Kg/cm$^2$ and the amount of trichloroethylene extracted was 42.6 weight percent.

Thermogravimetric data of the composition at the rate of 20° C/min. are shown as Curve 1 in the accompanying drawing.

Table

| Frequency Used Measurement | Example 1 $\alpha$ | Example 1 tan $\delta$ | Reference Example $\alpha$ | Reference Example tan $\delta$ | Commercial G/E Board, FR-5 * $\alpha$ | Commercial G/E Board, FR-5 * tan $\delta$ |
| --- | --- | --- | --- | --- | --- | --- |
| 30Hz | 3.66 | $0.402 \times 10^{-2}$ | 4.62 | $3.705 \times 10^{-2}$ | 5.23 | $0.530 \times 10^{-2}$ |
| 110Hz | 3.65 | $0.360 \times 10^{-2}$ | 4.49 | $3.741 \times 10^{-2}$ | 5.21 | $0.530 \times 10^{-2}$ |
| 1KHz | 3.62 | $0.351 \times 10^{-2}$ | 4.30 | $2.720 \times 10^{-2}$ | 5.17 | $0.725 \times 10^{-2}$ |
| 10KHz | 3.61 | $0.265 \times 10^{-2}$ | 4.16 | $1.967 \times 10^{-2}$ | 5.10 | $1.197 \times 10^{-2}$ |
| 100KHz | 3.60 | $0.270 \times 10^{-2}$ | 4.06 | $1.369 \times 10^{-2}$ | 4.99 | $1.590 \times 10^{-2}$ |
| 1MHz | 3.58 | $0.250 \times 10^{-2}$ | 3.97 | $1.188 \times 10^{-2}$ | 4.86 | $1.610 \times 10^{-2}$ |

*Commercial printed circuit board of glass cloth and epoxy resin meeting fire retardant standard FR-5 of National Electrical Mfrs. Assn.

It will be apparent to persons skilled in the art that changes in the proportions, ingredients and conditions described in the foregoing examples can be made without departing from the scope of this invention as heretofore disclosed.

What is claimed is:

1. A flame retardant thermosetting resin composition essentially comprising (a) a liquid butadiene-containing resin having an average molecular weight of about 1000 to about 5000 and being selected from the group consisting of acryloyloxy- and methacryloyloxy-terminated homopolymer of butadiene and copolymer of butadiene with acrylonitrile or styrene that contain at least about 70 weight percent of butadiene, said butadiene-containing resin having from about 1.5 to about 3.0 terminating acryloyloxyl or methacryloyloxyl groups per molecule of said butadiene-containing resin, (b) between about 150 and 500 weight percent based on said butadiene-containing resin of one or more ethylenically unsaturated monomers each of which is copolymerizable with end vinyl groups of said terminating groups of said butadiene-containing resin and with at least one of said monomers containing halogen directly attached to aryl in an amount sufficient to provide from about 25 to about 70 weight percent based on said composition of said halogen directly attached to aryl, (c) between about 5 and about 20 weight percent based on said butadiene-containing resin of ethylenically unsaturated acid anhydride and (d) between about 0.1 and 2.0 weight percent, based on the total weight of the resin composition of peroxide hardening agents or photosensitizers for promoting light-hardening.

2. A flame retardant thermosetting resin composition according to claim 1 wherein at least about 70 weight percent of said butadiene-containing resin is 1,2-polybutadiene.

3. A flame retardant thermosetting resin composition according to claim 1 further including for said composition a hardening agent in an amount between about 0.1 and about 2 weight percent based on the total weight of said composition.

4. A flame retardant thermosetting resin composition according to claim 3 wherein said hardening agent is a peroxide selected from the group of benzoyl peroxide, lauroyl peroxide, dicumyl peroxide, methyl ethyl ketone peroxide, dibutyl peroxide and cumene hydroperoxide.

5. A flame retardant thermosetting resin composition according to claim 3 wherein said hardening agent is a photosensitizer selected from the group of benzoin, benzophenone, benzoin ethyl ether and 2-methylanthraquinone.

6. A flame retardant thermosetting resin composition according to claim 1 wherein the halogen of said ethylenically unsaturated monomer is chlorine or bromine and is attached directly to a benzene ring of said monomer.

7. A flame retardant thermosetting resin composition according to claim 1 wherein said ethylenically unsaturated monomer containing halogen is selected from the group of monobromostyrene, dibromosytrene, tribromophenyl acrylate, tribromophenyl methacrylate, 2,2-bis-(4'-allyloxy-3',5'-dibromophenyl) propane, monobromophenyl allyl ether, dibromophenyl allyl ether, tribromophenyl allyl ether, monochlorostyrene and dichlorostyrene.

8. A flame retardant thermosetting resin composition according to claim 1 wherein said ethylenically unsaturated acid anhydride is selected from the group of maleic acid anhydride, itaconic acid anhydride, dodecenyl succinic acid anhydride, methyl-endo-methylene-tetrahydrophthalic acid anhydride, tetrahydrophthalic acid anhydride and methyltetrahydrophthalic acid anhydride.

9. A flame retardant thermosetting resin composition according to claim 1 wherein said halogen is about 25 to about 50 weight percent based on said composition.

10. A flame retardant thermosetting resin composition according to claim 1 wherein said halogen is about 28 to about 40 weight percent based on said composition.

11. A flame retardant thermosetting resin composition according to claim 7 wherein another ethylenically unsaturated monomer is included and is selected from the group of styrene, divinyl-benzene, methyl methacrylate, methyl acrylate, glycidyl methacrylate, and ethylene dimethacrylate.

12. A flame retardant printed circuit board which includes an electrically conductive material and an electrically insulating radically reactive thermosetting resin composition essentially comprising (a) a liquid butadiene-containing resin having an average molecular weight of about 1000 to about 5000 and being selected from the group consisting of acryloyloxy- and methacryloyloxy-terminated homopolymer of butadiene and copolymer of butadiene with acrylonitrile or styrene that contain at least about 70 weight percent of butadiene, said butadiene-containing resin having from about 1.5 to about 3.0 terminating acryloyloxyl or methacryloyloxyl groups per molecule of said butadiene-containing resin, (b) between about 150 and about 500 weight percent based on said butadiene-containing resin of one or more ethylenically unsaturated monomers each of which is copolymerizable with end vinyl groups of said terminating groups of said butadienecontaining resin and with at least one of said monomers containing halogen directly attached to aryl in an amount sufficient to provide from about 25 to about 70 weight percent based on said composition of said halogen attached to aryl, (c) between about 5 and about 20 weight percent based on said butadiene-containing resin of ethylenically unsaturated acid anhydride, and (d) between about 0.1 and 2. weight percent, based on the total weight of the resin composition of peroxide hardening agents or photosensitizers for promoting light hardening.

13. A flame retardant printed circuit board according to claim 12 which includes glass cloth impregnated with the thermosetting resin composition.

14. A flame retardant thermosetting resin composition essentially comprising: (a) a liquid butadiene-containing resin having an average molecular weight of about 1000 to about 5000 and being selected from the group consisting of acryloyloxy- and methacryloyloxy-terminated homopolymer of butadiene and copolymer of butadiene with acrylonitrile or styrene that contain at least about 70 weight percent of butadiene, said butadiene-containing resin having from about 1.5 to about 3.0 terminating acryloyloxyl or methacryloyloxyl groups per molecule of said butadiene-containing resin; (b) between about 150 and 500 weight percent based on said butadiene-containing resin of one or more ethylenically unsaturated monomers each of which is copolymerizable with the end vinyl groups of said terminating groups of said butadiene-containing resin and with at least one of said monomers containing halogen directly attached to aryl, each said monomer being selected from the group consisting of styrene, divinylbenzene, methyl methacrylate, methyl acrylate, glycidyl methacrylate, ethylene dimethacrylate, monobromostyrene, dibromosytrene, tribromophenyl acrylate, tribromophenyl methacrylate, 2,2-bis-(4'-allyloxy-3',5'-dibromophenyl) propane, monobromophenyl allyl ether, dibromophenyl allyl ether, tribromophenyl allyl ether, monochlorostyrene and dichlorostyrene; (c) between about 5 and 20 weight percent based on said butadiene-containing resin of ethylenically unsaturated acid anhydride selected from the group consisting of maleic acid anhydride, itanoic acid anhydride, dodecenyl succinic acid anhydride, methyl-endomethylene-tetrahydrophthalic acid anhydride, tetrahydrophthalic acid anhydride and methyltetrahydrophthalic acid anhydride, and (d) between about 0.1 and 2.0 weight percent, based on the total weight of the resin composition of peroxide hardening agents or photosensitizers for promoting light-hardening.

15. A flame retardant printed circuit board which includes an electrically conductive material and an electrically insulating thermosetting resin composition essentially comprising: (a) a liquid butadiene-containing resin having an average molecular weight of about 1000 to about 5000 and being selected from the group consisting of acryloyloxy- and methacryloyloxy-terminated homopolymer of butadiene and copolymer of butadiene with acrylonitrile or styrene that contain at least about 70 weight percent of butadiene, said butadiene-containing resin having from about 1.5 to about 3.0 terminating acryloyloxyl or methacryloyloxyl groups per molecule of said butadiene-containing resin; (b) between about 150 and 500 weight percent based on said butadiene-containing resin of one or more ethylenically unsaturated monomers each of which is copolymerizable with the end vinyl groups of said terminating groups of said butadiene-containing resin and with at least one of said monomers containing halogen directly attached to aryl in an amount sufficient to provide from about 25 to about 70 weight percent based on said composition of said halogen attached to aryl, each said monomer being selected from the group consisting of styrene, divinyl-benzene, methyl methacrylate, methyl acrylate, glycidyl methacrylate, ethylene dimethacrylate, monobromostyrene, dibromostyrene, tribromophenyl acrylate, tribromophenyl methacrylate, 2,2-bis-(4'-allyloxy-3',5'-dibromophenyl) propane, monobromophenyl allyl ether, dibromophenyl allyl ether, tribromophenyl allyl ether, monochlorostyrene and dichlorostyrene; (c) between about 5 and 20 weight percent based on said butadiene-containing resin of ethylenically unsaturated acid anhydride selected from the group consisting of maleic acid anhydride, itaconic acid anhydride, dodecenyl succinic acid anhydride, methyl-endomethylene-tetrahydrophthalic acid anhydride, tetrahydrophthalic acid anhydride and methyl-tetrahydrophthalic acid anhydride, and (d) between about 0.1 and 2.0 weight percent, based on the total weight of the resin composition of peroxide hardening agents or photosensitizers for promoting light-hardening.

* * * * *